(12) United States Patent
Sangiuliano

(10) Patent No.: US 8,196,889 B2
(45) Date of Patent: Jun. 12, 2012

(54) INTRODUCED DISPOSITION IN SUPPORT FOR PLASMA TELEVISION SETS AND ITS SIMILAR

(76) Inventor: Carlos Sangiuliano, São Paulo (BR)

( * ) Notice: Subject to any disclaimer, the term of this patent is extended or adjusted under 35 U.S.C. 154(b) by 128 days.

(21) Appl. No.: 12/934,363

(22) PCT Filed: Feb. 4, 2009

(86) PCT No.: PCT/BR2009/000041
§ 371 (c)(1),
(2), (4) Date: Sep. 24, 2010

(87) PCT Pub. No.: WO2009/117792
PCT Pub. Date: Oct. 1, 2009

(65) Prior Publication Data
US 2011/0017888 A1 Jan. 27, 2011

(30) Foreign Application Priority Data
Mar. 26, 2008 (BR) .................................. 8800821 U

(51) Int. Cl.
*A47F 7/14* (2006.01)
*A47G 1/16* (2006.01)
(52) U.S. Cl. ....................... 248/475.1; 466/476; 466/917
(58) Field of Classification Search ............... 248/475.1, 248/489, 476, 497, 466, 917
See application file for complete search history.

(56) References Cited

U.S. PATENT DOCUMENTS

| 2,688,901 | A | * | 9/1954 | Haugaard | 248/476 |
|---|---|---|---|---|---|
| 4,290,710 | A | * | 9/1981 | Waller | 403/306 |
| 7,147,196 | B2 | * | 12/2006 | Knight et al. | 248/490 |
| 7,309,053 | B2 | * | 12/2007 | Lin | 248/476 |
| 7,677,521 | B2 | * | 3/2010 | Price | 248/475.1 |
| 7,913,976 | B2 | * | 3/2011 | Gaunt | 254/11 |

\* cited by examiner

*Primary Examiner* — Amy J Sterling
(74) *Attorney, Agent, or Firm* — Mark Levy; Hinman, Howard & Kattell, LLP

(57) ABSTRACT

Introduced Disposition In Support For Plasma Television Sets And Its Similar, idealized in the form of a practical and functional support kit for holding plasma or LCD ('liquid crystal display') television sets, belonging to the field of mechanics, and to which was given an original manufacturing disposition, by consisting of a set of television set (1) fixing elements, formed by two or more hinged disks (2), two or more supports (3) and two or more catches or wedges (4), besides the standard screws M4, M5, M6 or M8 (P), screws with corresponding sleeves and washers, that promote the installation in independent fixing points, thus making the model universal, easily adaptable, and not needing the previous determination of the perforations contained on the television set, in the VESA standards, at the time of acquisition of the support kit.

1 Claim, 4 Drawing Sheets

INTRODUCED DISPOSITION IN SUPPORT FOR PLASMA TELEVISION SETS AND ITS SIMILAR

Figure 1:
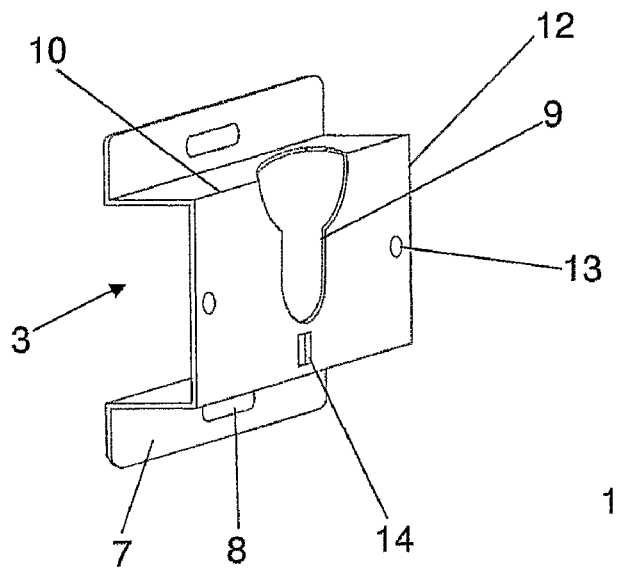

The present Descriptive Report refers to the presentation of a practical and functional support kit for holding plasma television sets or those of LCD ("liquid crystal display") on walls, belonging to the field of mechanics, and to which was given an original building disposition, since it is a safe support, of low cost and of easy installation in relation to other models found in the market.

Therefore, in this patent request, there is an accessory for installing plasma television sets on walls especially projected and developed to obtain great practicality and bringing many advantages, both in its use and in its manufacture.

The use of plasma or LCD ("liquid crystal display") television monitors has been expanding due to advantages such as lower energy consumption; presenting reduced dimension in comparison to other models, the non emission of noxious radiations, the capacity of forming a practically perfect image, stable, with no scintillation, which is less tiring for the eyes, provided it is operating in its native resolution; the fact that the black color created emits some light, conferring the image a grayish or bluish tinge, that is more comfortable to the eyes in aesthetic aspects and also of brightness, among others.

Associated to this fact also arouse the need to develop adequate devices for their attachment and support on their use location, since, conceptually, these monitors were made to take the least space possible on tables, shelves, or even to be fixed directly on the walls. Thus, technicians specialized on this subject have searched for the development of fixing and supporting devices for LCD and plasma television monitors that attend the standard VESA "Mounting".

The Flat Display Mounting Interface (FDMI), also known as "VESA Mounting Interface Standard" (MIS) or commonly as VESA, belongs to a family of rules defined by the Video Electronics Standards Association (VESA) for mounting flat screen or LCD monitors, televisions and other monitors for shelves or walls. Such rules are aimed at standardizing the mounting of modern monitors, screens and television sets.

The first standard in this family was introduced in 1997 and was

The mounting standard VESA MIS-D consists on four screws organized in a square, with the horizontal and vertical distances between the screws of about 100 mm. Such standard still is the configuration used for desk top computer monitors. The standard for smaller sized monitors was defined as 75 mm×75 mm.

The mounting standard VESA MIS-D adopts 10 mm perforations threads M4. Adequate fixers (usually 10 mm) are usually supplied with mounting; however, they are easily obtained in hardware stores.

FDMI was extended in 2006 with a collection of more standard screws, which are more adequate for larger plasma monitors. The following standardized measures are now in use:

MIS-D 75: 75 mm×75 mm;
MIS-D 100: 5 100 mm×100 mm;
MIS-E: 200 mm×100 mm;
MIS-F: 200 mm×200 mm, 400 mm×400 mm, 600 mm×200 mm, 600 mm×400 mm, 800 mm×400 mm and 280 mm×150 mm. As examples of complete identification of a mounting with FDMI mounting standard are:
VESA MIS-D, 100, C;
VESA MIS-F, 200, 200, 6;
where:

the code after the abbreviation identifies the part of the standard used; for example: B, C, D, E for flat screens with 10 cm to 78 cm of diagonal length; F for flat screens with 79 cm to 230 cm of diagonal length;

for the letter D: variation can occur in the diagonal for part D, one number identifies the variations of 75 mm and 100 mm (100 or 75);

for the letter F: one pair of numbers identifies the maximum width and height of the standard measures of the orifices;

for the letters B and E: the final letter identifies the location of the flat screen monitor interface, such as center (C), top (T), back (B), left (L), right (R), top and back (T/B), or left and right (L/R);

for the letter F: the final digit distinguishes between 10 mm perforation and screw M6 and 15 mm perforation and screw M8.

Besides the perforation standards, the regulation also specifies requirements for the location ou cables (Source: Flat Display Mounting Interface Standard 5 (FDMI), 1.0 Revision 1, VESA-2006-2, Video Electronics Standards Association, January 2006).

In face of this standardization, in the particular case of plasma television sets, some types of fixers were developed. The requests MU 8501495-8, MU 8502626-3 and UM 8600981-8 contains examples of plasma television supports found in the market; however, with limitations in relation to their versatility due to increasing changes, degree of difficulty for installation and safety after fixation.

Taking these inconveniences into account and, after uncountable studies and research, the inventor, a person acting in this area, created and developed the object of the present patent, idealizing a support kit for plasma or LCD television sets of easy installation, adapted to any model of television or thin screen with VESA standard, or not, and with a load capacity above that of supports usually in the market, making it universal and applicable to any plasma or LCD television sets.

Because it is formed by element that promote independent fixing points is becomes a universal model, easily adaptable and dispensing the previous determination of the distance between perforations on the television set, within VESA standards, at the purchase time.

Therefore, the present patent was projected to obtain an accessory for the fixation of monitors and television sets with the least possible number of parts, conveniently shaped and arranged to perform their functions with unmatchable efficacy and versatility and without the inconveniences previously mentioned.

Its innovative shape allow to obtain an excellent level of applicability, offering a support model which, presenting an excellent finishing in electrozinc metal sheet and electrostatic painting, has great durability, resistance and is matching with the decoration of the place where the television set will be installed.

Subsequently, for better understanding and comprehension of how the "INTRODUCED DISPOSITION IN SUPPORT FOR PLASMA TELEVISION SETS AND ITS SIMILAR" consists, which is here requested, the attached illustration drawings are described here:

FIG. 1—Depicts a frontal perspective view of one of the supports, an integral part of the support kit for television sets.

Figure 2:
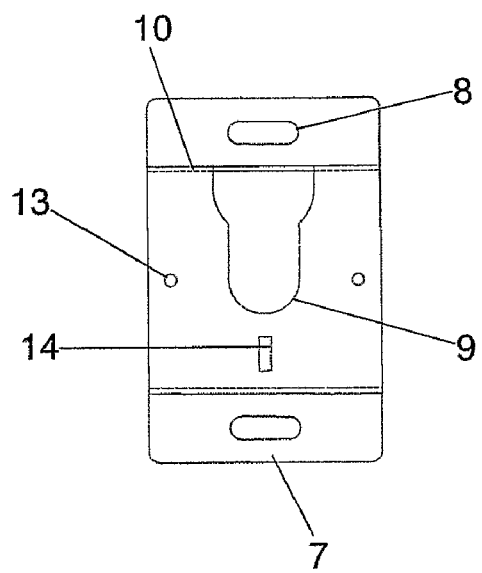

FIG. 2—Depicts a front view on one of the supports, an integral part of the support kit for television sets.

Figure 3:
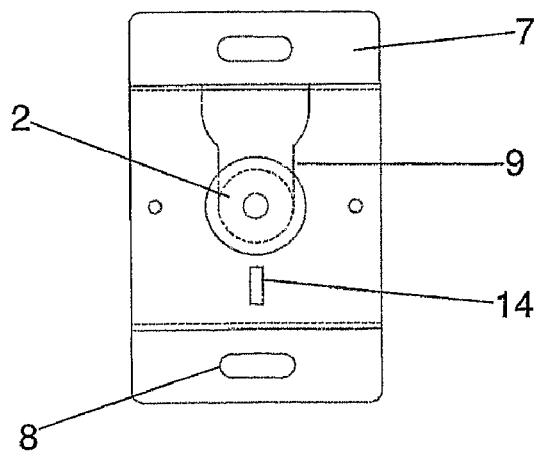

FIG. 3—Depicts a front view on one of the supports, illustrating the hinged disk coupled inside the oblong support orifice.

Figure 4:
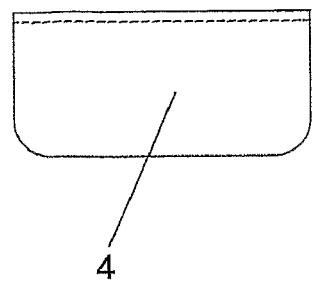

FIG. 4—Depicts a side view of one of the catches or wedges, an integral part of the support kit for television sets.

Figure 5:
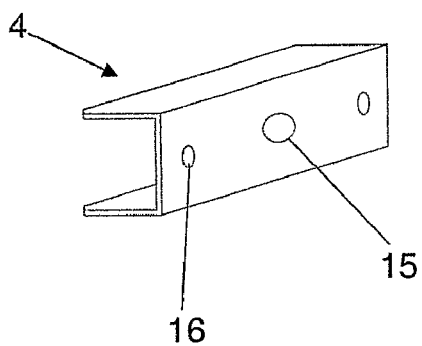

FIG. 5—Depicts a top perspective view of one of the catches or wedges.

Figure 6:
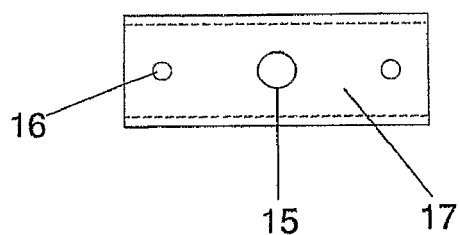

FIG. 6—Depicts a top view of one of the catches or wedges.

Figure 7:
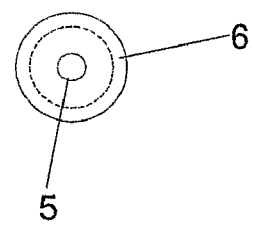

FIG. 7—Depicts a top view of one of the hinged discs, an integral part of the support kit for television sets.

Figure 8:
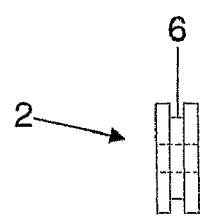

FIG. 8—Depicts a side view of one of the hinged disks.

Figure 9:
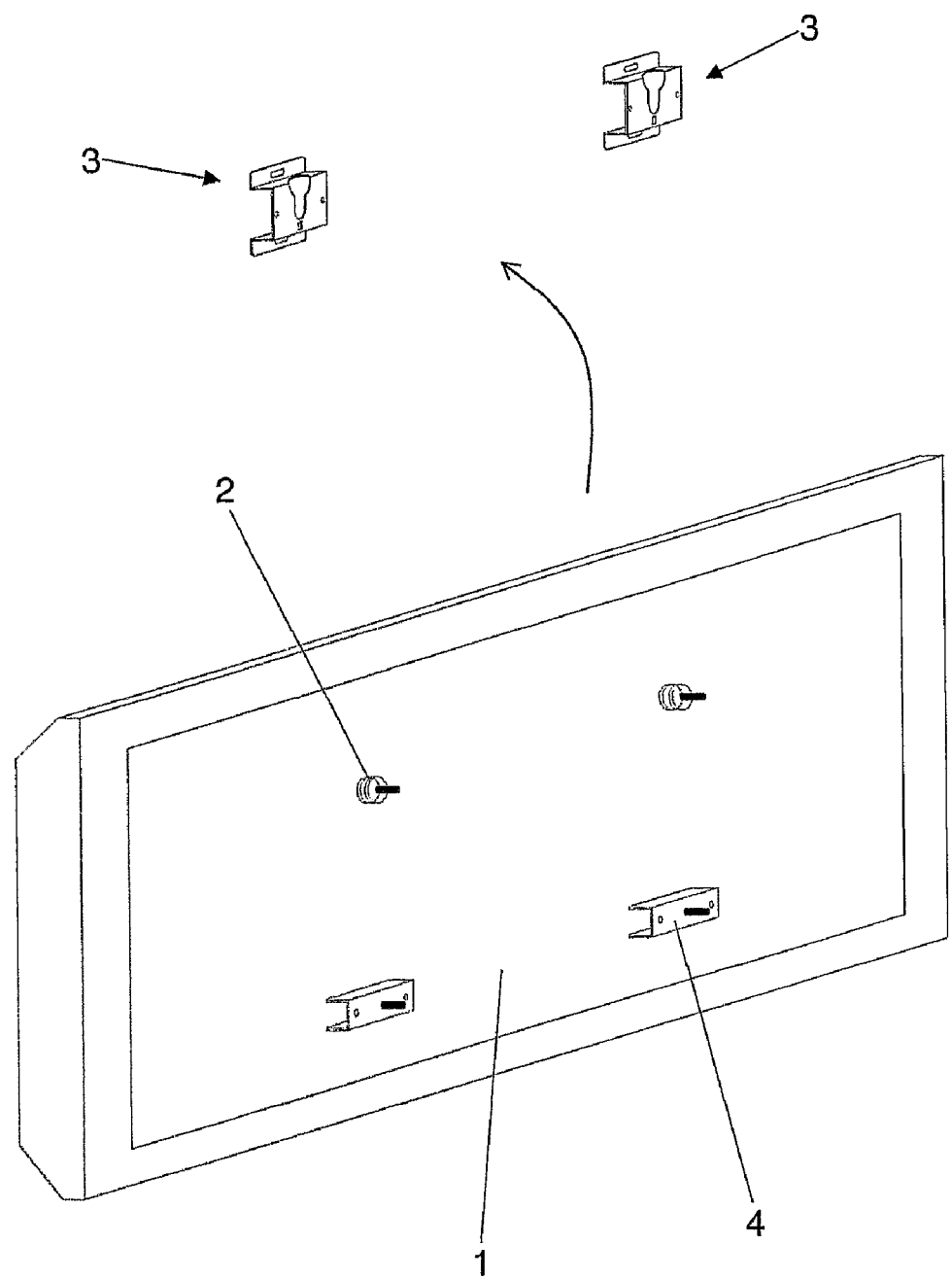

FIG. 9—Depicts a front perspective view of the supports fixed on the wall, before placement of the television set.

Figure 10:
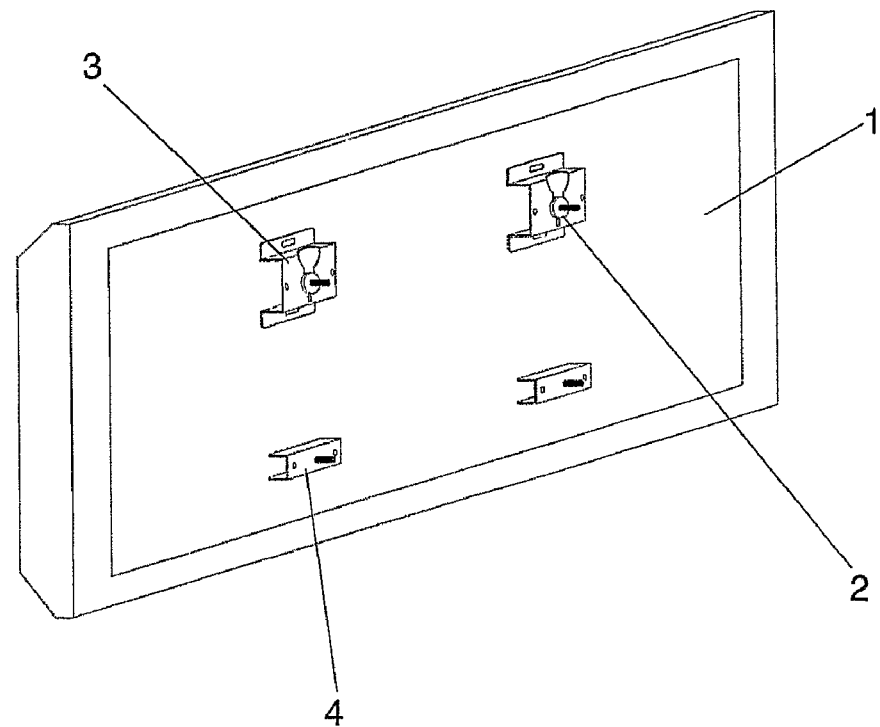

FIG. 10—Depicts a front perspective view of the television set, after its installation by the coupling of the radial grooves of the hinged disks inside the respective oblong orifices.

Figure 11:
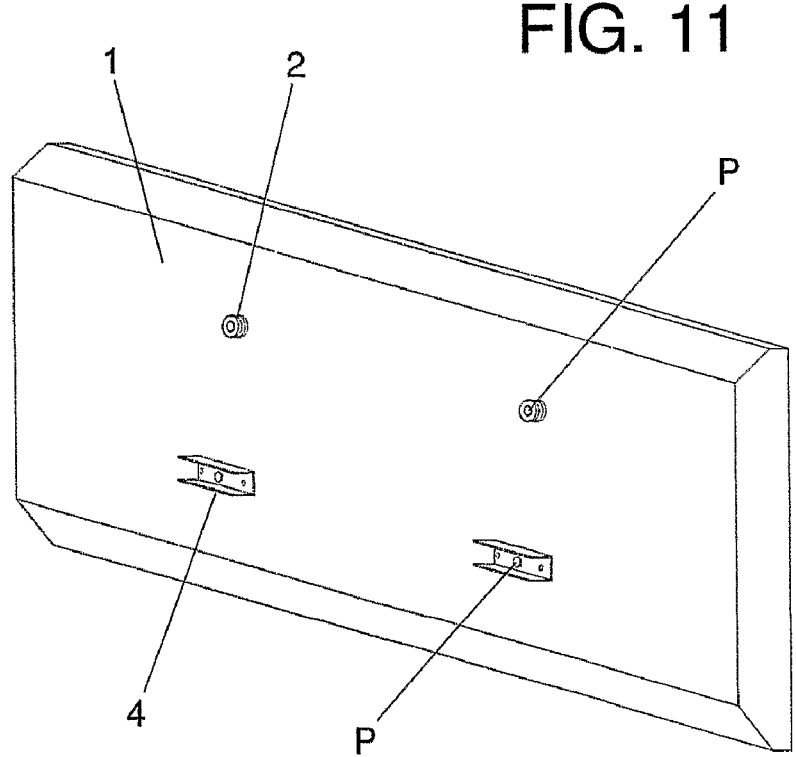

FIG. 11—Depicts a back perspective view of the television set, illustrating the hinged disks and catches or wedges installed.

According to as much as the figures above mentioned illustrate, the "Introduced disposition in support for Plasma television sets and its similar", subject of the present patent, essentially characterizes by consisting of set of fixation elements for television sets (1), formed by two or more hinged disks (2), two or more supports (3) and two or more catches or wedges (4), besides standard screws M4, M5, MB or M8 (P), screws with corresponding sleeves and washers.

Each hinged disk (2) consists of a central hollow orifice (5), with diameter compatible with standard screws M4, M5, M6 or M8 (P), while presenting a radial groove (6) centrally disposed around its external perimeter.

Each support (3) consists of a rectangular "U" shaped bordered metal sheet (7) with oblong orifices (8), passed by 5 screws when the support is fixed on walls or panels. In the front face of the support another oblong support orifice is placed (9), millimetrically larger than the internal diameter of the radial groove (6) of the hinged disk (5) and where one of the ends extends and enlarges until the perimeter (10) of one of the solidary extremes, coupling with the semicircular groove (11) disposed on the side of the rectangular "U" shaped bordered metal sheet. Both the semicircular groove (11) and the extreme enlargement itself have diameter and width discretely greater than the external diameter of the hinged disks (1). Near the open perimeters (12) orifices are symmetrically placed (13), while near the other end of the oblong support orifice (9) a rectangular orifice is placed (14).

Each catch or wedge (4) consists of a "U" shaped metal sheet presenting a central orifice (15) with diameter compatible with standard screws M4, M5, M6 or M8 (P), and smaller openings (16) near the open ends of the front face (17).

The kit of fixing elements is installed as now described:

Fastening of the hinged disks (2) by inserting standard screws M4, M5, M6 or M8 (P) in the respective hollow orifices (5), and their proper threadings in the upper orifices existing in the back of the television set (1), adequate for fixing supports.

Coupling of the oblong support orifice (9) of each support (3) in the radial grooves (6) of the hinged disks (2), aligning them with the television set (1), and, subsequently, measure the distance between the rectangular orifices (14) of the supports (3) with a measuring tape.

Location of the drilling points on the wall, using two or more supports as templates (3), leveled and aligned and inferring the distance between the supports (3), according to the measure obtained.

Drilling, insertion of the sleeves and installation of the supports (3) on the wall, by inserting the appropriate screws through the respective oblong orifices (8).

Installation of the catches or wedges (4) by the insertion of standard screws M4, M5, M6 or M8 (P) in the respective hollow orifices (15), and the appropriate threading in the lower orifices existing in the back of the television set (1), for fixing the supports.

Placement of the television set on the wall (1) by coupling of the radial grooves (6) of the hinged disks (2) in the respective oblong support orifice (9) of the supports (3), by aligning the hinged disks (2) within the enlarged groove contained in the extremes of such oblong support orifices (9), and the support of the free extremes of the catches or wedges (4) on the wall.

Therefore, this descriptive report presented a new conception about plasma television sets supports presenting, as could demonstrate by analysis made and figures shown, several differences over the conventional models existing in the consumer market, besides the manufacturing and functional technical characteristics, which are completely different from those pertaining to the state of such technique. Due to the advantages presented and, moreover, by the unquestionable innovative characteristics that fill all 5 requirements of novelty and originality of the gender, the present "INTRODUCED DISPOSITION IN SUPPORT FOR PLASMA TELEVISION SETS AND ITS SIMILAR" meets the required conditions to deserve the privilege of Utility Model. While the present request was described in reference to the above intended mode, it will be clear to those versed on the technique that other changes in the composition and details of the process can be done here, without moving far from the spirit and purpose requested, as well defined on the attached claim.

The invention claimed is:

1. "INTRODUCED DISPOSITION IN SUPPORT FOR PLASMA TELEVISION SETS AND ITS SIMILAR", consisting of a set of fixing elements for television sets (1), formed by two or more hinged disks (2), two or more supports (3) and two or more catches or wedges (4), besides standard screws M4, M5, M6 or M8 (P), screws with corresponding sleeves and washers; such kit is characterized by each hinged disk (2) presenting a central hollow orifice (5), with diameter compatible with standard screws M4, M5, M6 or M8 (P), and a radial groove (6) centrally disposed around its external perimeter; each support (3) is made of a rectangular "U" shaped bordered metal sheet (7) with oblong orifices (8), passed by screws when the support is fixed on walls or panels, where the central face of the support presents another oblong support orifice (9), with width millimetrically greater than the internal diameter of the radial groove (6) of the hinged disk (5) from where one of extremes extends and enlarges until the perimeter (10) of the solidary extremes, coupling to a semicircular groove (11) disposed on the side of rectangular "U" shaped metal sheet, and both the semicircular groove (11) and the enlargement of the extreme itself have diameter and width slightly greater than the external diameter of hinged disks (1); near the open perimeters (12) orifices (13) are symmetrically placed, while near the other extreme of the oblong support orifice (9) a rectangular orifice (14) is located; each catch or wedge (4) consists of rectangular "U" shaped metal sheet with a central orifice (15) with diameter compatible with standard screws M4, M5, M6 or M8 (P), and smaller orifices (16) near the open extremes of the front face (17), in such a manner that the kit of support elements ins installed as described: fastening of the hinged disks (2) by inserting standard screws M4, M5, M6 or M8 (P) in the respective hollow orifices (5), and their proper threadings in the upper orifices existing in the back of the television set (1), adequate for fixing supports; coupling of the oblong support orifice (9) of each support (3) in the radial grooves (6) of the hinged disks (2), aligning them with the television set (1), and, subsequently, measuring the distance between the rectangular orifices (14) of the supports (3) with a measuring tape; locating the drilling points on the wall, using two or more supports (3) as templates, leveled and aligned and inferring the distance between the supports (3), according to the measure obtained; drilling, insertion of the sleeves and installation of the supports (3) on the wall, by inserting the appropriate screws through the respective oblong orifices (8); installation of the catches or wedges (4) by the insertion of standard screws M4, M5, M6 or M8 (P) in the respective hollow orifices (15), and the appropriate threading in the lower orifices existing in the back of the television set (1), for fixing the supports; and, placement of the television set on the wall (1) by coupling of the radial grooves (6) of the hinged disks (2) in the respective oblong support orifices (9) of the supports (3), by aligning the hinged disks (2) within the enlarged groove contained in the extremes of such oblong support orifices (9), and the support of the free extremes of the catches or wedges (4) on the wall.

\* \* \* \* \*